(12) United States Patent
Baek et al.

(10) Patent No.: US 10,516,325 B2
(45) Date of Patent: Dec. 24, 2019

(54) PRECISE SPATIAL MOTION DEVICE

(71) Applicant: INDUSTRY-ACADEMIC COOPERATION FOUNDATION, YONSEI UNIVERSITY, Seoul (KR)

(72) Inventors: Yoon Su Baek, Seoul (KR); Jung Soo Choi, Daegu (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 291 days.

(21) Appl. No.: 15/416,021

(22) Filed: Jan. 26, 2017

(65) Prior Publication Data

US 2017/0222535 A1 Aug. 3, 2017

(30) Foreign Application Priority Data

Feb. 1, 2016 (KR) .......................... 10-2016-0012510

(51) Int. Cl.
 *H02K 41/02* (2006.01)
 *H02K 11/30* (2016.01)
 *H02K 41/03* (2006.01)
(52) U.S. Cl.
 CPC ............. *H02K 41/02* (2013.01); *H02K 11/30* (2016.01); *H02K 41/031* (2013.01); *H02K 2201/18* (2013.01)
(58) Field of Classification Search
 CPC ..... H02K 41/02; H02K 11/30; H02K 2201/18
 USPC ....................................................... 310/12.06
 See application file for complete search history.

(56) References Cited

U.S. PATENT DOCUMENTS

| 6,211,775 B1* | 4/2001 | Lee .......................... G08B 6/00 340/407.1 |
| 6,259,174 B1* | 7/2001 | Ono .................... G03F 7/70758 310/13 |
| 6,917,126 B2* | 7/2005 | Tsuboi ................. H02K 41/031 310/12.04 |

(Continued)

FOREIGN PATENT DOCUMENTS

| KR | 10-2001-0016682 A | 3/2001 |
| KR | 10-0362930 B1 | 11/2002 |
| KR | 10-2011-0136204 A | 12/2011 |

OTHER PUBLICATIONS

Kwang Suk Jung et al., "A Study on the Driving Principles of a Novel Non-contact Surface Actuator Using Combination of Magnetic Forces," Journal of the Korean Society for Precision Engineering, Mar. 2001, pp. 115-121, vol. 18, Issue 3.

(Continued)

*Primary Examiner* — Thanh Lam
(74) *Attorney, Agent, or Firm* — Sughrue Mion, PLLC

(57) ABSTRACT

Disclosed is a precise spatial motion device including: a motion unit including a plurality of drivers that do not contact each other and are elastically connected to each other; and a control unit that controls the drivers to drive in a six-degree-of-freedom manner and in three-dimensional space by controlling magnetic force. In accordance with the constructions of the present disclosure, the drivers are connected to each other in a non-contact and frictionless manner, and thus, driving may be performed in a six-degree-of-freedom manner and in three-dimensional space. Accordingly, position and attitude errors are not accumulated, whereby precise motion control may be achieved.

7 Claims, 7 Drawing Sheets

(56) References Cited

U.S. PATENT DOCUMENTS

2008/0203828 A1\* 8/2008 Compter ............. G03F 7/70758
　　　　　　　　　　　　　　　　　　　　　　310/12.06
2010/0194117 A1\* 8/2010 Pabon .................... H02K 35/02
　　　　　　　　　　　　　　　　　　　　　　290/1 R

OTHER PUBLICATIONS

Communication dated Aug. 1, 2017 from the Korean Intellectual Property Office in corresponding Korean Patent Application No. 10-2016-0012510.

\* cited by examiner (a)          (b)

PRECISE SPATIAL MOTION DEVICE

CROSS-REFERENCE TO RELATED APPLICATION

This application claims the priority benefit of Korean Patent Application No. 10-2016-0012510, filed on Feb. 1, 2016 in the Korean Intellectual Property Office, the disclosure of which is incorporated herein by reference.

BACKGROUND OF THE INVENTION

Field of the Invention

The present disclosure relates to a precise spatial motion device, more particularly to a precise spatial motion device capable of precise six-degree-of-freedom and three-dimensional movement in a non-contact and frictionless manner.

Description of the Related Art

In general, spatial motion devices are capable of six-degree-of-freedom movement in six directions, i.e., x, y, z, roll, pitch, and yaw directions, and three-dimensional movement in a space. Such spatial motion devices realize six-degree-of-freedom movement by driving a plurality of objects, which are connected in a friction manner, in a contact manner and three-dimensionally move using the objects.

Since such spatial motion devices realize six-degree-of-freedom movement by moving a plurality of objects in contact with each other in a state in which the objects are connected to each other in a mutually frictional manner, position and attitude errors generated when one object moves and position and attitude errors generated when another object moves are accumulated. Such error accumulation is difficult to eliminate due to a complex six-degree-of-freedom movement mechanism that performs six-degree-of-freedom movement by moving a plurality of objects.

In addition, friction generated by contact-type driving of a plurality of objects mutually connected in a friction manner is a factor that hinders the accuracy of movement. Accordingly, research into a precise spatial motion device capable of precise six-degree-of-freedom and three-dimensional movement is underway.

RELATED DOCUMENT

Patent Document (Patent Document 1)—Korean Patent No. 10-0362930 (registered on Nov. 18, 2002)

SUMMARY OF THE INVENTION

Therefore, the present invention has been made in view of the above problems, and it is an object of the present invention to provide a precise spatial motion device capable of six-degree-of-freedom and three-dimensional movement in a non-contact and frictionless manner.

In accordance with the present invention, the above and other objects can be accomplished by the provision of a precise spatial motion device, including: a motion unit including a plurality of objects that do not contact each other and are frictionlessly connected to each other; and a control unit controlling magnetic force generation among the objects and thus controlling the objects of the motion unit to move in a non-contact and frictionless manner.

According to an aspect of the present disclosure, the motion unit may include a first driving body; a second driving body spaced apart from the first driving body while facing the first driving body in a z-axis direction; and a connection part disposed between the first and second driving bodies and elastically connecting the first and second driving bodies to each other.

According to an aspect of the present disclosure, the first and second driving bodies may have a rectangular flat-plate shape corresponding to each other, and the connection part may include a plurality of elastic bodies that are disposed between the first and second driving bodies and frictionlessly connect the first and second driving bodies to each other.

According to an aspect of the present disclosure, a driving projection protruding in a z-axis direction may be provided to any one of the first and second driving bodies, and a driving hole, through which the driving projection passes, may be provided to the other of the first and second driving bodies.

According to an aspect of the present disclosure, the control unit may include a permanent magnet unit including a plurality of permanent magnets that are disposed in x, y and z-axis directions and installed on the first driving body while facing the second driving body; a coil part including a plurality of coils that are disposed in x, y and z-axis directions and installed on the second driving body while facing the first driving body; and a current control unit applying current to the coil part.

According to an aspect of the present disclosure, the permanent magnet unit may include a plurality of z-axis magnets that have an identical z-axis direction and are provided to the first driving body while being spaced apart from each other in multiple rows and columns; a plurality of x-axis magnets that are disposed between the z-axis magnets while facing each other in the x-axis direction and provided to the first driving body while being spaced apart from each other in an identical x-axis direction; and a plurality of y-axis magnets that are provided between the z-axis magnets while facing each other in the y-axis direction and are provided to the first driving body while being spaced apart from each other in an identical y-axis direction, and the coil part may include a plurality of z-axis coils that are provided to the second driving body while respectively facing the z-axis magnets; a plurality of x-axis coils that are provided to the second driving body while respectively facing the x-axis magnets; and a plurality of y-axis coils that are provided to the second driving body while respectively facing the plurality of y-axis magnets.

According to an aspect of the present disclosure, the second driving body may include a plurality of openings through which the z-axis magnets pass in a z-axis direction.

According to an aspect of the present disclosure, the z-axis magnets may be provided in multiple rows and columns while being spaced apart from each other at an identical interval in x-axis and y-axis directions, at least a pair of x-axis magnets may be provided between the z-axis magnets facing in a y-axis direction among the z-axis magnets while facing each other in an x-axis direction, and at least a pair of y-axis magnets may be provided between the z-axis magnets facing in an x-axis direction among the z-axis magnets while facing each other in a y-axis direction.

According to an aspect of the present disclosure, the permanent magnet unit may include a first magnet having a z-axis direction and installed on the first driving body; a second magnet having a z-axis direction and installed on the first driving body while being spaced apart from the first magnet in a positive (+) x-axis direction; a third magnet having a z-axis direction and installed on the first driving body while being spaced apart from the first magnet in a negative (−) y-axis direction; a fourth magnet having a z-axis direction and installed on the first driving body while being spaced apart from the third magnet in a positive (+) x-axis direction; a fifth magnet having an x-axis direction and installed between the facing first and second magnets on the first driving body; a sixth magnet having an x-axis direction and installed between the facing third and fourth magnets on the first driving body while facing the fifth magnet in a y-axis direction; a seventh magnet having a y-axis direction and installed between the facing first and third magnets on the first driving body; and an eighth magnet having a y-axis direction and installed between the second and fourth magnets on the first driving body while facing the seventh magnet in an x-axis direction, and the coil part may include first to eighth coils that are installed on positions, which respectively face the first to eighth magnets, of the second driving body.

According to an aspect of the present disclosure, a plurality of openings, through which the first to fourth magnets pass in a z-axis direction, may be provided to the second driving body.

In accordance with another aspect of the present invention, there is provided a precise spatial motion device, including: a motion unit including a plurality of drivers that do not contact each other and are elastically connected to each other; and a control unit that controls the drivers to drive in a six-degree-of-freedom manner and in three-dimensional space by controlling magnetic force.

According to an aspect of the present disclosure, the motion unit may include a first driving body; a second driving body spaced apart from the first driving body while facing the first driving body in a z-axis direction; and a connection part including a plurality of elastic bodies disposed between the first and second driving bodies and elastically, frictionlessly connecting the first and second driving bodies to each other.

According to an aspect of the present disclosure, a driving projection protruding in a z-axis direction may be provided to any one of the first and second driving bodies, and a driving hole, through which the driving projection passes, may be provided to the other of the first and second driving bodies.

According to an aspect of the present disclosure, the control unit may include a permanent magnet unit including a plurality of permanent magnets that are disposed in x, y and z-axis directions and installed on the first driving body while facing the second driving body; a coil part including a plurality of coils that are disposed in x, y and z-axis directions and installed on the second driving body while facing the first driving body; and a current control unit applying current to the coil part.

According to an aspect of the present disclosure, the permanent magnet unit may include a first magnet having a z-axis direction and installed on the first driving body; a second magnet having a z-axis direction and installed on the first driving body while being spaced apart from the first magnet in a positive (+) x-axis direction; a third magnet having a z-axis direction and installed on the first driving body while being spaced apart from the first magnet in a negative (−) y-axis direction; a fourth magnet having a z-axis direction and installed on the first driving body while being spaced apart from the third magnet in a positive (+) x-axis direction; a fifth magnet having an x-axis direction and installed between the facing first and second magnets on the first driving body; a sixth magnet having an x-axis direction and installed between the facing third and fourth magnets on the first driving body while facing the fifth magnet in a y-axis direction; a seventh magnet having a y-axis direction and installed between the facing first and third magnets on the first driving body; and an eighth magnet having a y-axis direction and installed between the second and fourth magnets on the first driving body while facing the seventh magnet in an x-axis direction, and the coil part may include first to eighth coils that are installed on positions, which respectively face the first to eighth magnets, of the second driving body.

According to an aspect of the present disclosure, a plurality of openings, through which the z-axis permanent magnets pass in a z-axis direction, may be provided to the second driving body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
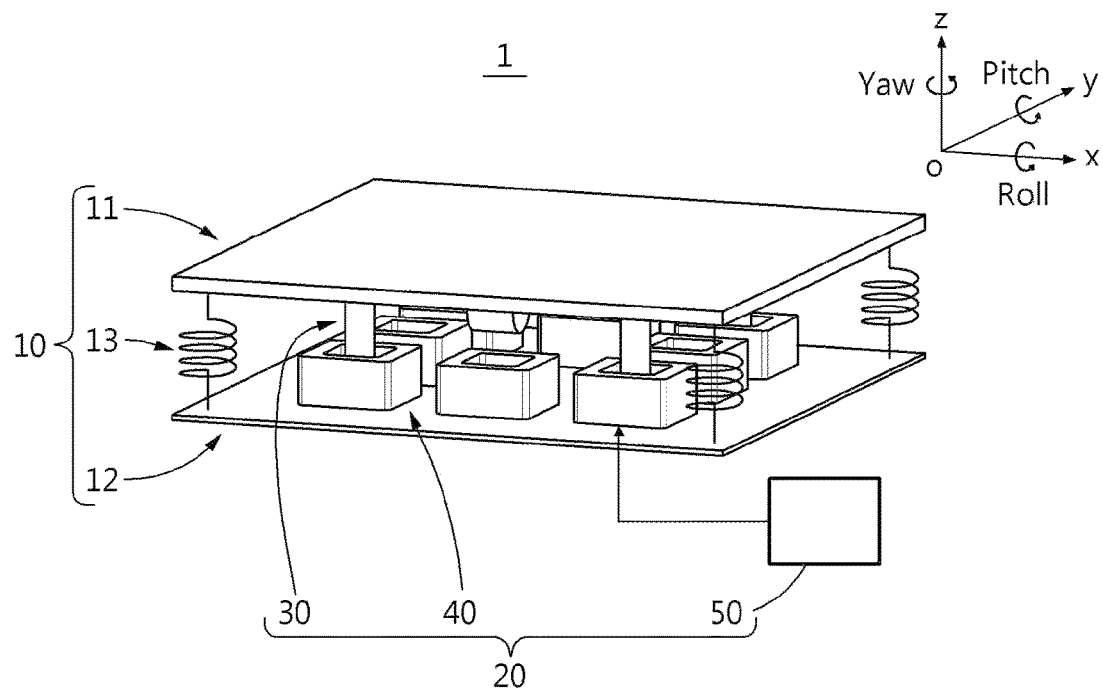
FIG. 1 is a perspective view schematically illustrating a precise spatial motion device according to a preferred embodiment of the present disclosure.

Hereinafter, preferred embodiments of the present invention are described with reference to the accompanying drawings Referring to FIG. 1, a precise spatial motion device according to a preferred embodiment of the present disclosure includes a motion unit 10 and a control unit 20.

For reference, the precise spatial motion device 1 described in the present disclosure may be applied to industrial fields requiring spatial movement such as high-resolution position or movement control devices, e.g., a microscope stage, a scanner, and a precise manipulator. In addition, the precise spatial motion device 1 may be applied to mobile high-precision robots that perform spatial tasks for macro/micro/nano technology.

The motion unit 10 includes a plurality of objects that do not contact each other and are frictionlessly connected to each other. The motion unit 10 includes a first driving body 11, a second driving body 12, and a connection part 13, as illustrated in FIG. 2.

The first driving body 11 has a substantially rectangular flat-plate shape. The second driving body 12 is spaced apart from the first driving body 11 in a z-axis direction, and has a shape corresponding to the shape of the first driving body 11, i.e., a rectangular flat-plate shape. Here, the first driving body 11 is spaced apart from the second driving body 12 in a positive direction of the z-axis while facing the second driving body 12, i.e., is disposed at an upper part of the second driving body 12 as illustrated in FIG. 2.

The connection part 13 is disposed between the first and second driving bodies 11 and 12 such that the first and second driving bodies 11 and 12 are elastically connected to each other. The connection part 13 includes a plurality of elastic bodies 14 to 17 disposed at corners between the first and second driving bodies 11 and 12. In the embodiment, the first and second driving bodies 11 and 12 have a rectangular flat-plate shape, and thus, the connection part 13 includes the four elastic bodies 14 to 17 that are disposed at four corners between the first and second driving bodies 11 and 12.

Figure 2:
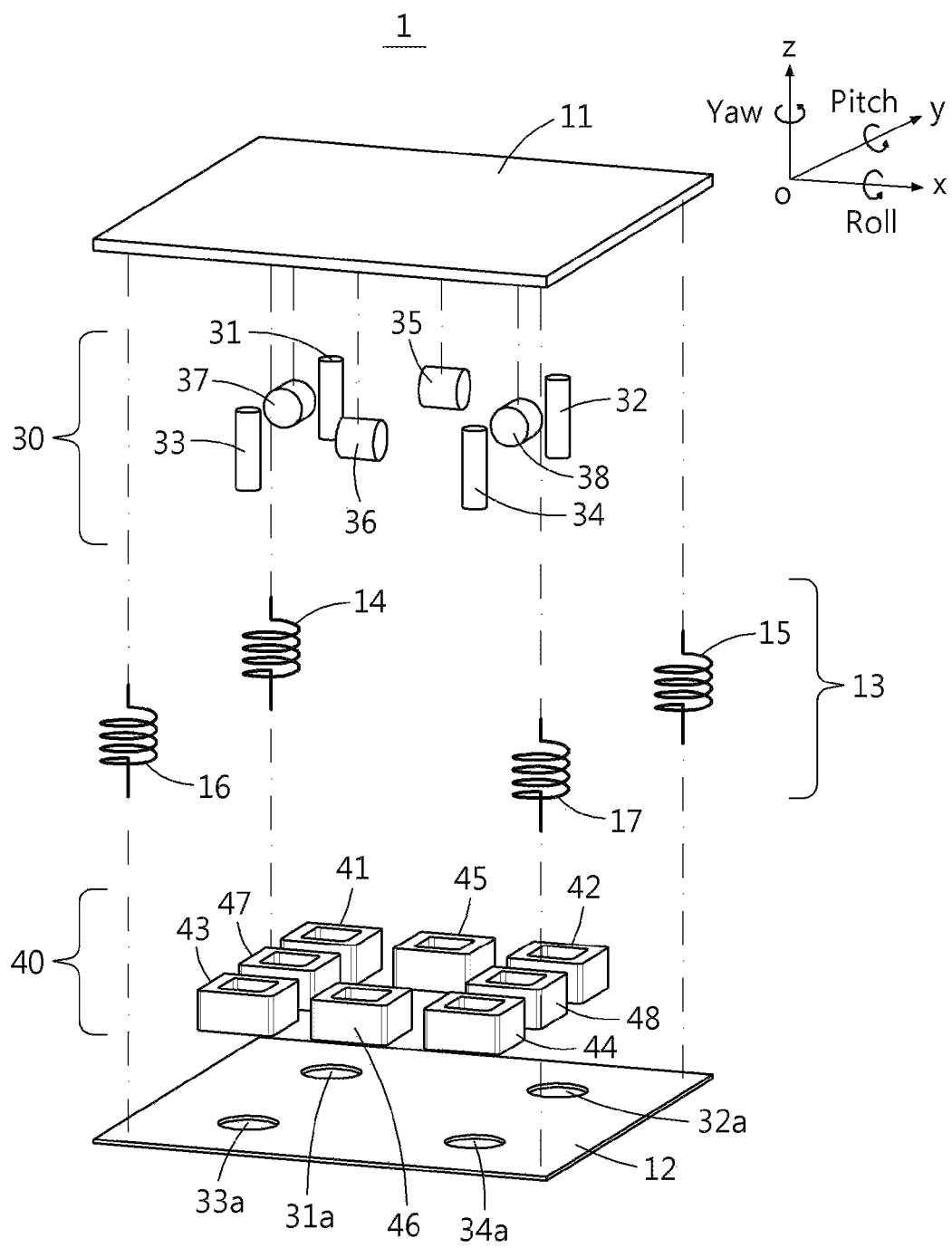
FIG. 2 is an exploded perspective view schematically illustrating the precise spatial motion device according to the embodiment illustrated in FIG. 1.

In the embodiment, four elastic bodies respectively installed at a left upper corner, a right upper corner, a left lower corner, and a right lower corner of the first and second driving bodies 11 and 12 are respectively represented as 14, 15, 16, and 17, referring to FIG. 2, for convenience of description. That is, the connection part 13 includes the first elastic body 14 disposed at the left upper corner; the second elastic body 15 disposed at the right upper corner; the third elastic body 16 disposed at the left lower corner; and the fourth elastic body 17 disposed at the right lower corner, between the first and second driving bodies 11 and 12.

Each of the first to fourth elastic bodies 14, 15, 16, and 17 includes a compression coil spring, and one end and another end thereof are respectively fixed to the first and second driving bodies 11 and 12, whereby the first and second driving bodies 11 and 12 mutually, elastically support each other and thus are frictionlessly connected to each other.

The control unit 20 causes the objects, i.e., the first and second driving bodies 11 and 12, of the motion unit 10, not to contact each other and to frictionlessly move, by magnetic force. To accomplish this, the control unit 20 includes a permanent magnet unit 30, a coil part 40, and a current control unit 50, as illustrated in FIG. 1.

The permanent magnet unit 30 includes a plurality of permanent magnets 31 to 38 disposed on a first mounting surface of the first driving body 11 facing the second driving body 12, in x, y and z-axis directions. Such permanent magnet unit 30 includes eight permanent magnets, i.e., the first to eighth magnets 31, 32, 33, 34, 35, 36, 37, and 38.

The first to fourth magnets 31, 32, 33, and 34 are disposed on the first driving body 11 to have the same direction, i.e., the z-axis direction, and be spaced apart from each other in multiple rows and columns. More particularly, referring to FIG. 2, the first magnet 31 is installed at a left upper corner of the first mounting surface of the first driving body 11, and the second magnet 32 is spaced apart from the first magnet 31, in a positive (+) x-axis direction. That is, the second magnet 32 is installed at a right upper corner of the first mounting surface of the first driving body 11. The third magnet 33 is installed at a left lower corner of the first mounting surface of the first driving body 11, spaced apart, in a negative (−) y-axis direction, from the first magnet 31, and the fourth magnet 34 is installed at a right lower corner of the first mounting surface of the first driving body 11, spaced apart, in a positive (+) x-axis direction, from the third magnet 33. Such first to fourth magnets 31, 32, 33, and 34 are z-axis magnets installed in two rows and columns.

The fifth and sixth magnets 35 and 36 are disposed at the first mounting surface of the first driving body 11 to have the same direction in an x-axis direction between the first to fourth magnets 31, 32, 33, and 34 and to be spaced apart from each other. More particularly, the fifth magnet 35 is disposed between the first and second magnets 31 and 32 facing each other, and the sixth magnet 36 is disposed between the third and fourth magnets 33 and 34 facing each other. Accordingly, the fifth and sixth magnets 35 and 36 are a pair of x-axis magnets installed at the first mounting surface of the first driving body 11 to face each other in the y-axis direction and be spaced apart from each other.

The seventh and eighth magnets 37 and 38 are disposed at the first mounting surface of the first driving body 11 to have the same y-axis direction between the first to fourth magnets 31, 32, 33, and 34 and to be spaced apart from each other. More particularly, the seventh magnet 37 is disposed between the first and third magnets 31 and 33, and the eighth magnet 38 is disposed between the second and fourth magnets 32 and 34. Accordingly, the seventh and eighth magnets 37 and 38 are a pair of y-axis magnets installed at the first mounting surface of the first driving body 11 to face each other in the x-axis direction and be spaced apart from each other.

The coil part 40 includes a plurality of coils 41 to 48 disposed on a second installation surface of the second driving body 12 facing the first driving body 11, in x, y and z-axis directions. Here, the coil part 40 includes eight coils 41 to 48 to correspond to the number of the permanent magnets 31 to 38 of the permanent magnet unit 30, and is installed on the second driving body 12.

More particularly, the first to fourth coils 41, 42, 43, and 44 are respectively installed on a left upper corner, a right upper corner, a left lower corner, and a right lower corner of the second installation surface of the second driving body 12 to respectively face the first to fourth magnets 31, 32, 33, and 34. In addition, the fifth and sixth coils 45 and 46 are installed to be spaced apart from each other in the y-axis direction and to respectively face the fifth and sixth magnets 35 and 36, on the second installation surface of the second driving body 12. The seventh and eighth coils 47 and 48 are installed to respectively face the seventh and eighth magnets 37 and 38 and to be spaced apart from each other in the x-axis direction on the second installation surface of the second driving body 12.

Here, each of the first to eighth coils 41, 42, 43, 44, 45, 46, 47, and 48 includes a solenoid coil having an air core in a z-axis direction such that the first to eighth magnets 31, 32, 33, 34, 35, 36, 37, and 38 are respectively inserted thereinto.

For reference, although the permanent magnet unit 30 includes the eight permanent magnets 31 to 38 and the coil part 40 includes the eight coils 41 to 48 to correspond to the eight permanent magnets 31 to 38 in the embodiment, the present disclosure is not limited thereto. That is, the numbers of the permanent magnet 31 to 38 and coil 41 to 48 may be changed depending upon the shapes and sizes of the first and second driving bodies 11 and 12.

Figure 5:
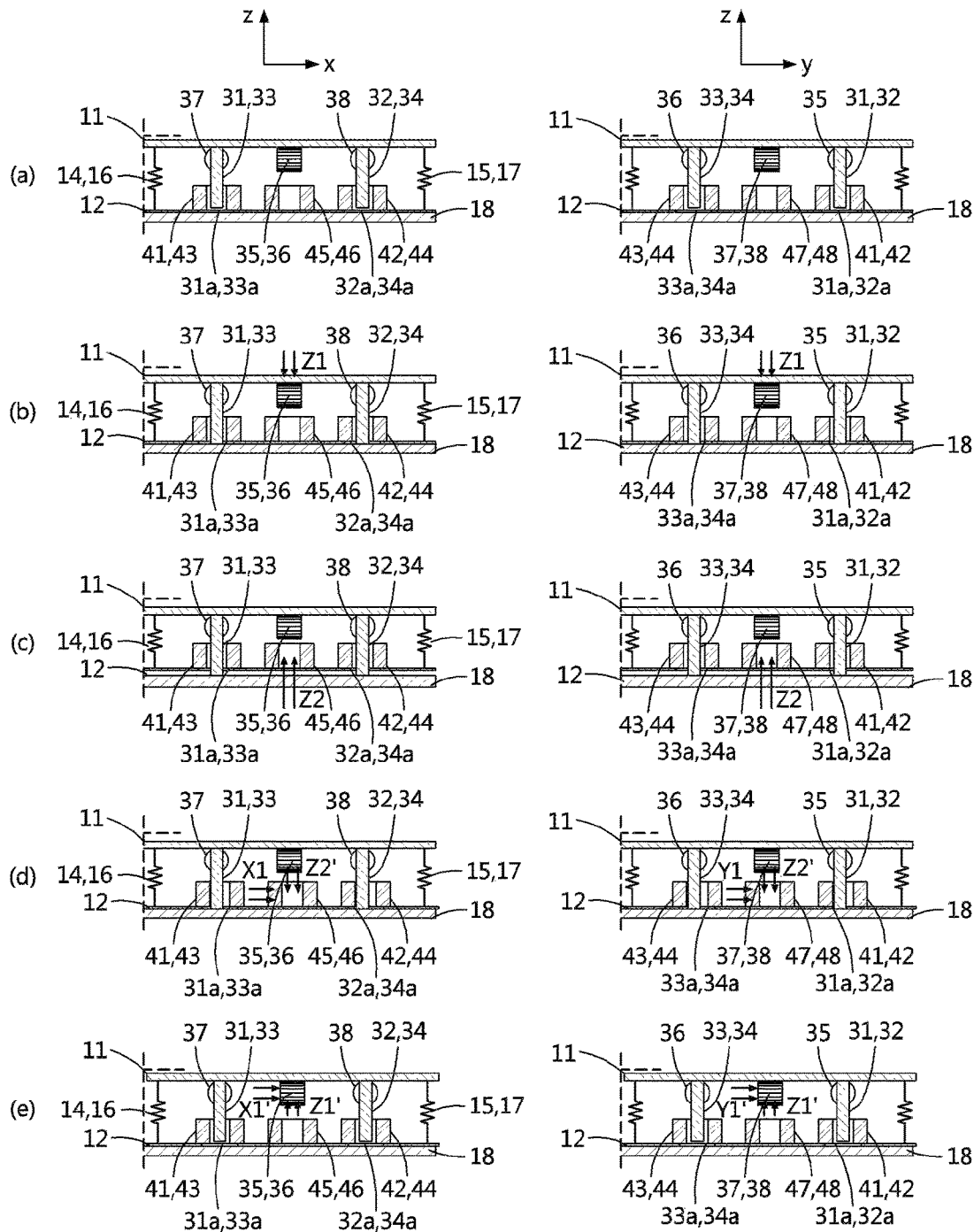
FIG. 5 illustrates schematic views to describe the operation principle of movement of the precise spatial motion device according to the embodiment illustrated in FIG. 1.

Meanwhile, the first and second driving bodies 11 and 12 are not fixed to a base 18 (see FIG. 5). Accordingly, the first to fourth openings 31a, 32a, 33a, and 34a, through which the first to fourth magnets 31, 32, 33, and 34 installed in the z-axis direction pass when the first and second driving bodies 11 and 12 are driven, are formed by penetrating the second driving body 12.

Figure 3:
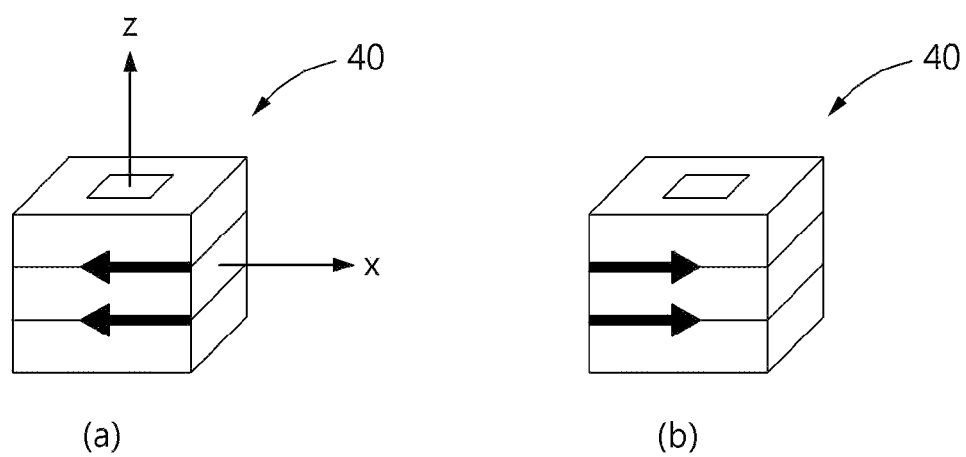
FIG. 3 is a view schematically illustrating the direction of current applied to a coil part of the precise spatial motion device according to the embodiment illustrated in FIG. 1.

The current control unit 50 controls current applied to the coil part 40. Magnetic field directions of the coil part 40 due to current applied by the current control unit 50 are illustrated in FIG. 3. As illustrated in FIG. 3(a), when clockwise current is applied to the coil part 40 by the current control unit 50, a negative (−) z-axis direction magnetic field is formed at the center of the coil part 40. In addition, as illustrated in FIG. 3(b), when a counterclockwise current is applied to the coil part 40 by the current control unit 50, a positive (+) z-axis direction magnetic field is formed at the center of the coil part 40.

Figure 4:
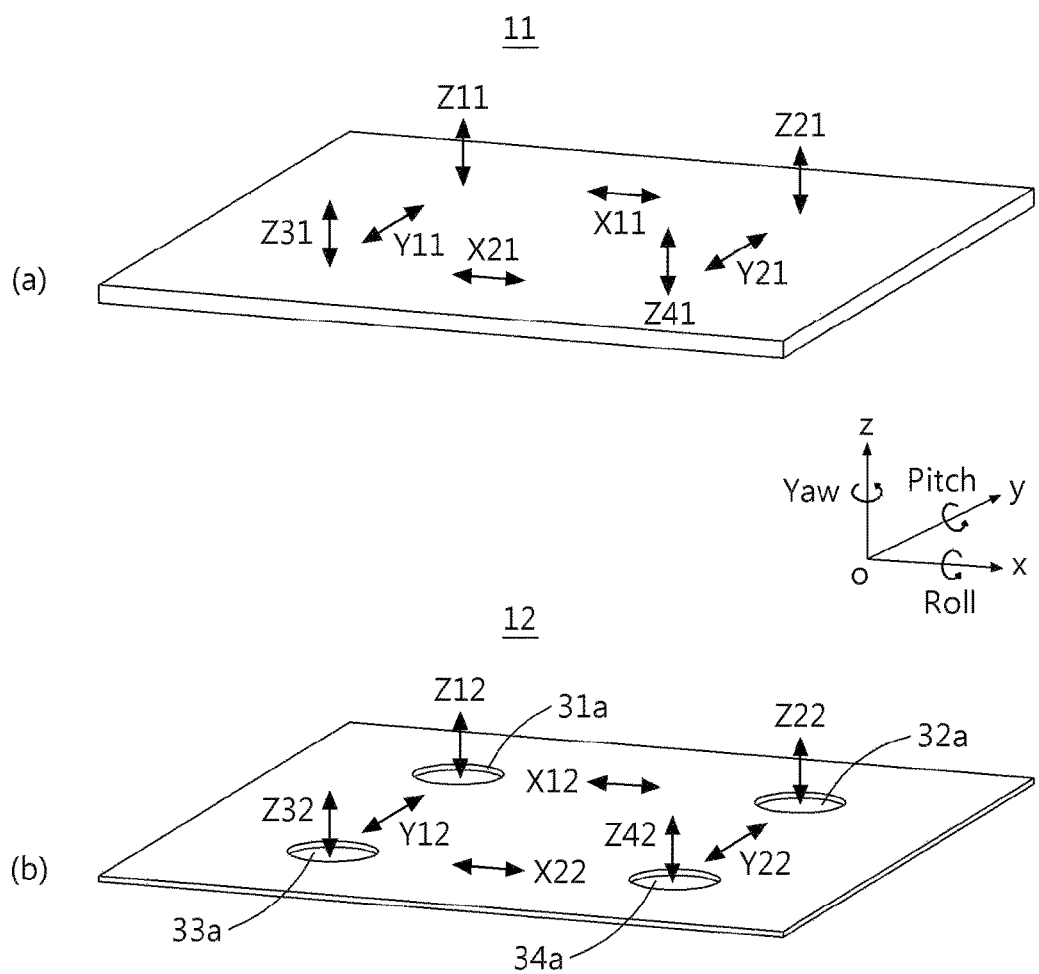
FIG. 4 is a view schematically illustrating an action force and reaction force generated in a non-contact manner by magnetic interaction of the precise spatial motion device according to the embodiment illustrated in FIG. 1.

The force generation principle of the precise spatial motion device 1 according to the present disclosure is schematically illustrated in FIG. 4.

Referring to FIG. 4, the first to fourth magnets 31, 32, 33, and 34 having a z-axis direction magnetic field, and the first to fourth coils 41, 42, 43, and 44 corresponding to the first to fourth magnets 31, 32, 33, and 34 electromagnetically interact with each other, whereby electromagnetic forces Z11, Z21, Z31, and Z41 having a z-axis direction, as action forces, are generated in the first driving body 11, and the electromagnetic forces Z12, Z22, Z32, and Z42 having a z-axis direction, as reaction forces thereof, are generated in the second driving body 12.

In addition, the fifth and sixth magnets 35 and 36, which have an x-axis direction magnetic field, and the fifth and sixth coils 45 and 46, through which current flows, electromagnetically interact with each other, whereby x-axis direction electromagnetic forces X11 and X21, as action forces, are generated in the first driving body 11, and x-axis direction electromagnetic forces X12 and X22, as reaction forces thereof, are generated in the second driving body 12. In addition, the seventh and eighth magnets 37 and 38, which have a y-axis direction magnetic field, and the seventh and eighth coils 47 and 48, through which current flows, electromagnetically interact with each other, whereby electromagnetic forces Y11 and Y21 having a y-axis direction, as action forces, are generated in the first driving body 11, and electromagnetic forces Y12 and Y22 having a y-axis direction, as reaction forces thereof, are generated in the second driving body 12.

Hereinafter, six-degree-of-freedom movement of the first and second driving bodies 11 and 12 by such electromagnetic force generation is described.

First, the operation principle of spatial movement generated in the first driving body 11 is as follows.

The z-axis direction electromagnetic forces Z11, Z21, Z31, and Z41 having the same magnitude and direction generated in the first driving body 11 generate Z movement which is translation movement with respect to the z-axis direction. When a resultant force of the action forces Z11 and Z21 between the first and second magnets 31 and 32 and the first and second coils 41 and 42 having the same magnitude and direction is different from a resultant force of the action forces Z31 and Z41 between the third and fourth magnets 33 and 34 and the third and fourth coils 43 and 44 having the same magnitude and direction, roll movement, as rotational movement with respect to the x-axis, is generated in the first driving body 11 due to such a resultant force difference. In addition, when a resultant force of the action forces Z11 and Z31 between the first and third magnets 31 and 33 and the first and third coils 41 and 43 having the same magnitude and direction is different from a resultant force of the action forces Z21 and Z41 between the second and fourth magnets 32 and 34 and the second and fourth coils 42 and 44 having the same magnitude and direction, pitch movement, as rotational movement with respect to the Y axis, is generated in the first driving body 11 due to such a resultant force difference.

The x-axis direction electromagnetic forces X11 and X21 having the same magnitude and direction generated in the first driving body 11 cause the first driving body 11 to generate X movement, as translation movement with respect to the x-axis direction. In this case, the two x-axis direction electromagnetic forces X11 and X21 having an identical magnitude but different direction cause the first driving body 11 to generate yaw movement, as rotational movement with the respect to the z-axis.

In addition, the y-axis direction electromagnetic forces Y11 and Y21 having the same magnitude and direction generated in the first driving body 11 cause the first driving body 11 to generate Y movement, as a y-axis direction translation movement. In addition, the y-axis direction electromagnetic forces Y11 and Y21 having an identical magnitude but different direction cause the first driving body 11 to generate yaw movement, as rotational movement with the respect to the z-axis.

In such manners, the first driving body 11 generates spatial movements, i.e., X, Y, Z, roll, pitch, and yaw movements. In this case, precise spatial movement of the first driving body 11 caused by electromagnetic force, as a precise non-contact driving force, is stabilized by a part providing a non-frictional force, elastic force, i.e., the connection part 13 including the first to fourth elastic bodies 14, 15, 16, and 17.

Next, the operation principle of spatial movement generated in the second driving body 12 is as follows.

The first to fourth magnets 31, 32, 33, and 34, which have a z-axis direction magnetic field, and the first to fourth coils 41, 42, 43, and 44, through which current flows in a counter-clockwise direction, electromagnetically interact with each other, whereby a negative z-axis direction electromagnetic force, as an action force, is generated in the first driving body 11 to move the first driving body 11 up to the base 18. When a counter-clockwise direction current applied to the first to fourth coils 41, 42, 43, and 44 is increased in a state in which the first driving body 11 is moved up to the base 18 in a such manner, the first to fourth magnets 31, 32, 33, and 34 and the first to fourth coils 41, 42, 43, and 44 electromagnetically interact with each other to further generate a negative z-axis direction electromagnetic force, as an action force, in the first driving body 11, but the first driving body 11 contacts the base 18 to limit additional movement in the negative z-axis direction. In this case, although the negative z-axis direction movement of the first driving body 11 is limited, the positive (+) z-axis direction electromagnetic forces Z12, Z22, Z32, and Z42, as reactions thereof, generate positive Z movement, as positive (+) z-axis direction translation movement, of the second driving body 12. When current applied to the second driving body 12 moved in the positive (+) z-axis direction decreases, negative z-axis direction translation movement, i.e., negative (−) Z movement, occurs.

When, in a state in which the second driving body 12 is moved in the positive (+) z-axis direction, a resultant force of two reaction forces having the same magnitude and direction, i.e., the reaction forces Z12 and Z22 between the first and second magnets 31 and 32 and the first and second coils 41 and 42 is different from a resultant force of the other two reaction forces having the same magnitude and direction, i.e., the reaction forces Z32 and Z42 between the third and fourth magnets 33 and 34 and the third and fourth coils 43 and 44, roll movement, as rotational movement with respect to the X axis, is generated in the second driving body 12 due to such a resultant force difference.

When, in a state in which the second driving body 12 is moved in the positive (+) z-axis direction, a resultant force of the reaction forces Z12 and Z32 between the first and third magnets 31 and 33 and the first and third coils 41 and 43 having the same magnitude and direction is different from a resultant force of the other two reaction forces having the same magnitude and direction, i.e., the reaction forces Z22 and Z42 between the second and fourth magnets 32 and 34 and the second and fourth coils 42 and 44, pitch movement, as rotational movement with the respect to the Y axis, is generated in the second driving body 12 due to such a resultant force difference.

In a state in which the second driving body 12 is moved in the positive (+) z-axis direction, the x-axis direction reaction forces X12 and X22 having the same magnitude and direction cause the second driving body 12 to generate X movement as translation movement with respect to the x-axis direction. In this case, in a state in which the second driving body 12 is moved in the positive (+) z-axis direction, the two x-axis direction reaction forces X12 and X22 having an identical magnitude but different direction cause the second driving body 12 to generate yaw movement, as rotational movement with the respect to the z-axis.

In addition, in a state in which the second driving body 12 is moved in the positive (+) z-axis direction, the y-axis direction reaction forces Y12 and Y22 having the same magnitude and direction cause the second driving body 12 to generate Y movement, as y-axis direction translation movement. In addition, in a state in which the second driving body 12 is moved in a positive (+) z-axis direction, the two y-axis direction reaction forces Y12 and Y22 having an identical magnitude but different direction cause the second driving body 12 to generate yaw movement as rotational movement with the respect to the z-axis.

In such manners, the second driving body 12 generates spatial movements, i.e., X, Y, Z, roll, pitch, and yaw movements. In this case, precise spatial movement of the second driving body 12 caused by electromagnetic force, as a precise non-contact driving force, is stabilized by a part providing a non-frictional elastic force, i.e., the connection part 13 including the first to fourth elastic bodies 14, 15, 16, and 17.

The operation principle of movement exercise of the precise spatial motion device 1 of the present disclosure having the aforementioned constitutions is described below with reference to FIG. 5.

First, referring to FIG. 5(a), the first to eighth coils 41, 42, 43, 44, 45, 46, 47, and 48 of the coil part 40, to which current is not applied by the current control unit 50, are illustrated. The first to fourth elastic bodies 14, 15, 16, and 17 of the connection part 13 guide and support the first driving body 11, whereby the first driving body 11 is in static equilibrium state by being spaced apart from the base 18 by a predetermined distance. In this case, the second driving body 12 is disposed on the base 18 (hereinafter referred to as "step 0").

Referring to FIG. 5(b), the first to fourth magnets 31, 32, 33, and 34, which are disposed in a z-axis direction, and the first to fourth coils 41, 42, 43, and 44, to which a counterclockwise current is applied, electromagnetically interact with each other, whereby the negative z-axis direction electromagnetic forces Z11, Z21, Z31, and Z41, as action forces, are generated in the first driving body 11. Accordingly, the negative z-axis direction electromagnetic force generated by the first driving body 11 becomes greater than a positive (+) z-axis direction spring force generated in the first driving body 11 by the first to fourth elastic bodies 14, 15, 16, and 17 of the connection part 13, whereby the first driving body 11 generates negative z-axis direction movement Z1. Due to the negative z-axis direction movement Z1, the first driving body 11 moves toward the base 18 (hereinafter referred to as "step 1").

Referring to FIG. 5(c), when current which has been maintained is increased in a state in which step 1 as illustrated in FIG. 5(b) is completed, an action force generated in the first driving body 11 increases, but movement of the first driving body 11 is limited by the base 18 so that the first driving body 11 no longer moves in the negative z-axis direction. On the other hand, the z-axis direction reaction forces Z12, Z22, Z32, and Z42 generated in the second driving body 12 cause the second driving body 12 to move (Z2) in the positive (+) z-axis direction, whereby movement stops at one point on the z-axis where the sum of the reaction forces Z12, Z22, Z32, and Z42, the gravity (W) of the second driving body 12, and the elastic forces of the first to fourth elastic bodies 14, 15, 16, and 17 become zero (0) (hereinafter referred to as "step 2").

Referring to FIG. 5(d), when current, which has been maintained, is decreased in a state in which step 2 illustrated in FIG. 5(c) is completed, the z-axis direction reaction forces Z12, Z22, Z32, and Z42 generated in the second driving body 12 are decreased. Accordingly, movement (Z2') of the second driving body 12 occurs in a negative z-axis direction, due to a negative (−) z-axis direction elastic force generated by built-in energy of the first to fourth elastic bodies 14, 15, 16, and 17 of step 2 and the gravity (W) of the second driving body 12, thereby being placed on the base 18.

At the same time, when a counterclockwise current is applied to the fifth to eighth coils 45, 46, 47, and 48, the fifth to eighth magnets 35, 36, 37, and 38, and the fifth to eighth coils 45, 46, 47, and 48, to which a counterclockwise current has been applied, electromagnetically interact with each other, whereby the positive (+) x-axis direction electromagnetic forces X12 and X22 and positive (+) y-axis direction electromagnetic forces Y12 and Y22, as reaction forces, are generated in the second driving body 12. Accordingly, in the second driving body 12, the positive (+) x-axis direction electromagnetic forces X12 and X22 and positive (+) y-axis direction electromagnetic forces Y12 and Y22 generated in the second driving body 12 are respectively greater than the negative (−) x-axis direction elastic force and negative (−) y-axis direction elastic force generated in the second driving body 12 by the first to fourth elastic bodies 14, 15, 16, and 17 which have stored energy in step 2, whereby a resultant force of horizontal forces thereof simultaneously generates positive (+) x-axis direction movement X1 and positive (+) y-axis direction movement Y1 (hereinafter referred to as "step 3")

Referring to FIG. 5(e), when current, which has been maintained, is decreased in a state in which step 3 is completed, an action force generated in the first driving body 11 is decreased and thus the positive (+) z-axis direction elastic force of the first to fourth elastic bodies 14, 15, 16, and 17, which have stored energy in step 3, causes the first driving body 11 to move (Z1') in a z-axis direction by positive (+) x-axis direction and positive (+) y-axis direction elastic forces. At the same time, positive (+) x-axis direction movement X1' and positive (+) y-axis direction movement Y1' are generated (hereinafter referred to as "step 4").

By steps 0 to 4, the precise spatial motion device 1 may be moved from one place to another place in three-dimensional space. Here, change in the direction of current applied to the fifth to eighth coils 45, 46, 47, and 48 enables movement in various directions in three-dimensional space. For example, when clockwise current is applied to the fifth to eighth coils 45, 46, 47, and 48, the precise spatial motion device 1 is moved in a direction opposite to that of step 4. i.e., is moved in negative (−) x-axis and negative (−) y-axis directions.

Meanwhile, the spatial movement and movement exercise of the precise spatial motion device 1 as described above are generated by applying current to the coil part 40 and, at the same time, stabilized by the elastic force of the connection part 13. Accordingly, simple and easy control may be accomplished without a separate sensor such as a displacement sensor or an on-off switch. Accordingly, the precise spatial motion device 1 according to the present disclosure may be variously applied, according to application purpose, to fields requiring spatial movement such as high-resolution position or movement control devices, e.g., a microscope stage, a scanner, and a precise manipulator. In addition, the precise spatial motion device 1 may be applied to mobile high-precision robots that perform spatial tasks for macro/micro/nano technology.

Figure 6:
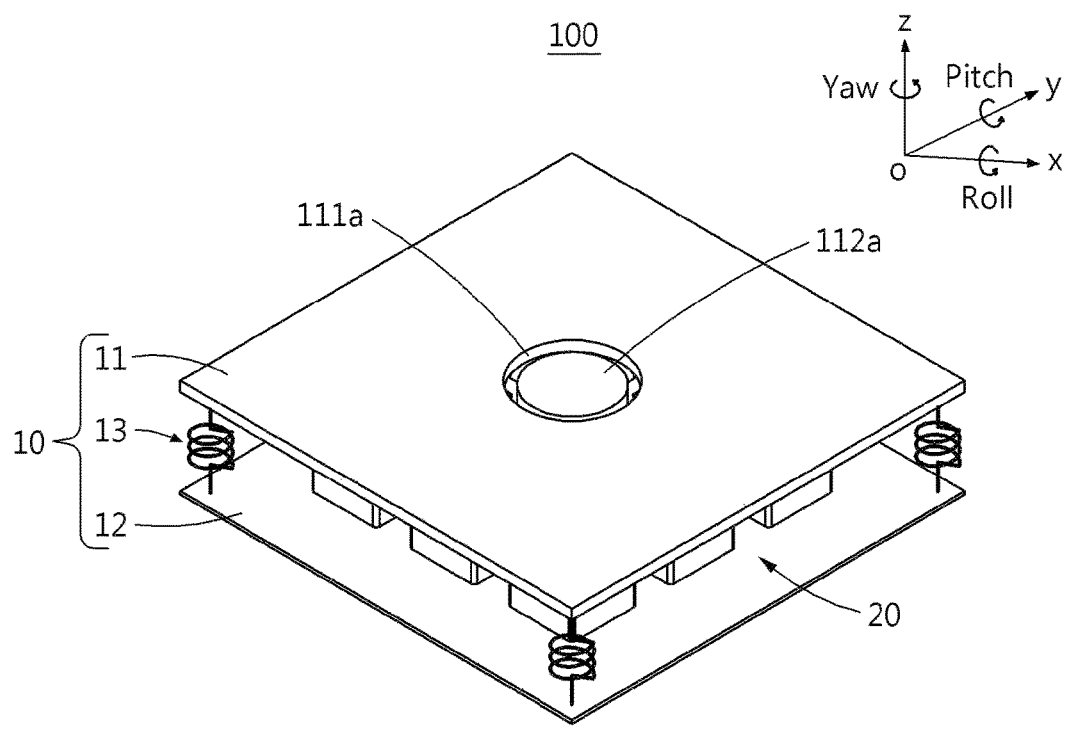
FIG. 6 is a perspective view schematically illustrating a precise spatial motion device according to another embodiment of the present disclosure.
Figure 7:
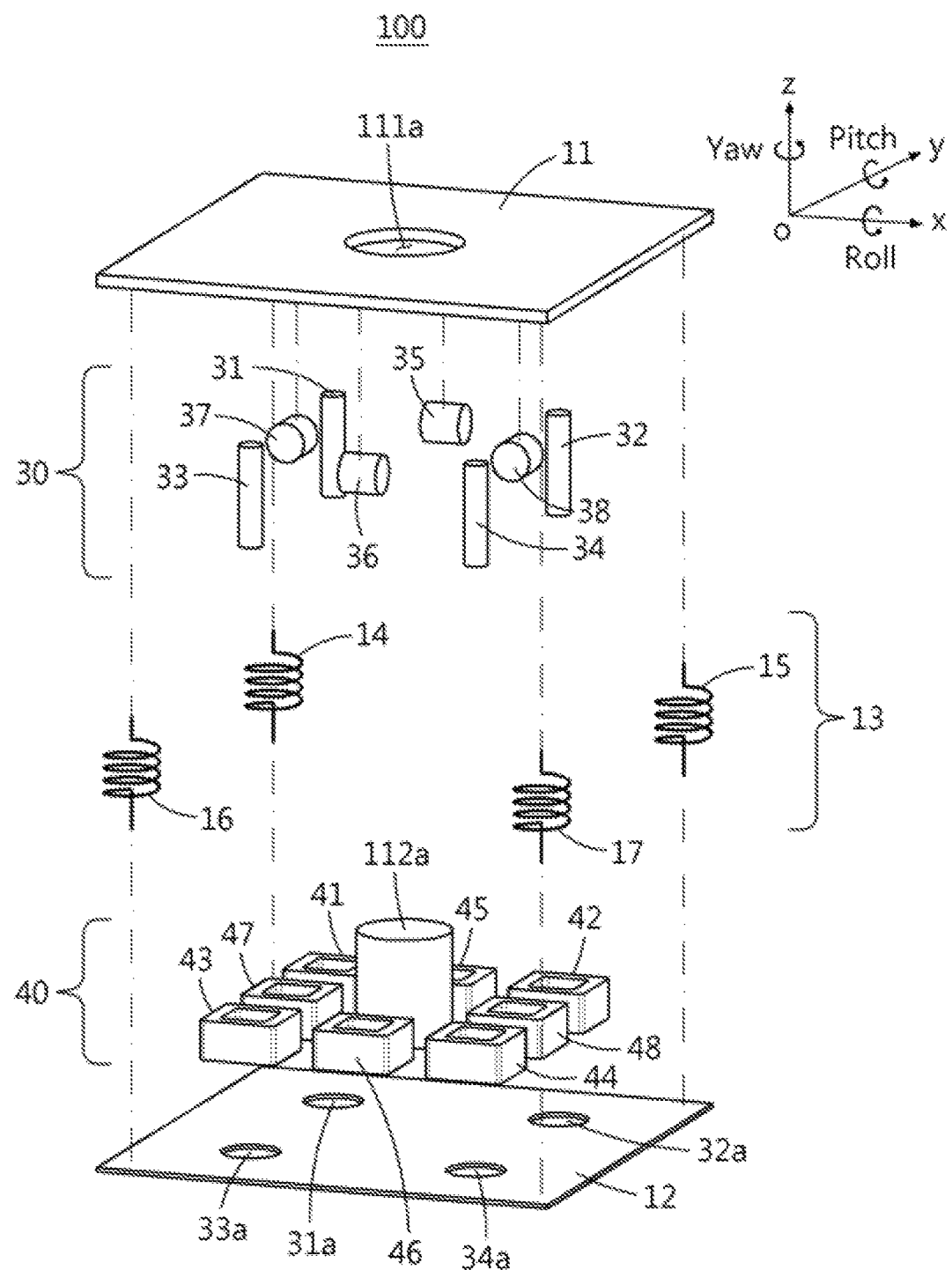
FIG. 7 is an exploded perspective view schematically illustrating the precise spatial motion device according to the embodiment of the present disclosure illustrated in FIG. 6.

Referring to FIGS. 6 and 7, the precise spatial motion device 100 according to another embodiment of the present disclosure is schematically illustrated.

Referring to FIGS. 6 and 7, the precise spatial motion device 100 according to another embodiment of the present disclosure includes a motion unit 10 and a control unit 20. Here, since the motion unit 10 and the control unit 20 have constructions similar to those of the embodiment described referring to FIGS. 1 and 2, the same reference numerals are assigned to the same constructions and detailed description thereof is omitted.

As illustrated in FIGS. 6 and 7, the motion unit 10 of the precise spatial motion device 100 according to another embodiment of the present disclosure includes a first driving body 11, which has a driving hole 111a, and a second driving body 12, which has a driving projection 112a installed in a z-axis direction to be able to move in and out through the driving hole 111a. The driving hole 111a has a sufficient diameter for the driving projection 112a to enter and exit while having a gap and is formed by penetrating the first driving body 11.

In the precise spatial motion device 100 according to another embodiment, the positions of the first and second driving bodies 11 and 12 are reversed, and thus, although the second driving body 12 is disposed on the first driving body 11 with respect to a z-axis direction, smooth driving is guided. That is, non-contact and frictionless driving of the first and second driving bodies 11 and 12 is guided by the driving projection 112a entering and exiting from the driving hole 111a.

In accordance with the present disclosure having the aforementioned constructions, first, the plurality of objects are respectively driven in a non-contact manner, whereby friction does not occur and the objects connected to each other may accomplish precise six-degree-of-freedom movement and three-dimensional movement exercise. That is, non-contact driving by electromagnetic force of the objects and elastic and frictionless connection by the connection part enables precise six-degree-of-freedom movement and three-dimensional movement exercise.

Second, the objects are driven by a magnetic force, as a non-contact active and precise force, generated among a plurality of permanent magnets and coils, and an elastic force, as a frictionless passive force, of a plurality of elastic bodies, thereby realizing six-degree-of-freedom movement and three-dimensional movement exercise having high precision.

Third, since each of the objects has six-degree-of-freedom movement ability, six-degree-of-freedom movement may be realized by movement of any one of the objects. Accordingly, position and attitude errors of the plurality of objects are not accumulated.

Fourth, since the first and second driving bodies facing each other are elastically connected to each other by the plurality of the elastic bodies, six-degree-of-freedom movement and three-dimensional movement exercise using the first and second driving bodies may be simply, easily controlled.

While the preferred embodiments of the present invention has been described referring to the accompanying drawings, those skilled in the art will appreciate that many modifications and changes can be made to the present invention without departing from the spirit and essential characteristics of the present invention.

DESCRIPTION OF SYMBOLS 1, 100: PRECISE SPATIAL MOTION DEVICE
10: MOTION UNIT
11: FIRST DRIVING BODY
12: SECOND DRIVING BODY
13: CONNECTION PART
18: BASE
20: CONTROL UNIT
30: PERMANENT MAGNET UNIT
40: COIL PART
50: CURRENT CONTROL PART

What is claimed is:
1. A precise spatial motion device, comprising:
a motion unit comprising a plurality of objects that do not contact each other and are frictionlessly connected to each other; and
a control unit controlling magnetic force generation among the objects and thus controlling the objects of the motion unit to move in a non-contact and frictionless manner,
wherein the motion unit comprises:
a first driving body;
a second driving body spaced apart from the first driving body while facing the first driving body in a z-axis direction; and
a connection part disposed between the first and second driving bodies and elastically connecting the first and second driving bodies to each other,
wherein the control unit comprises:
a permanent magnet unit comprising a plurality of permanent magnets that are disposed in x, v and z-axis directions and installed on the first driving body while facing the second driving body;
a coil part comprising a plurality of coils that are disposed in x, y and z-axis directions and installed on the second driving body while facing the first driving body; and
a current control unit applying current to the coil part,
wherein the permanent magnet unit comprises:
a plurality of z-axis magnets that have an identical z-axis direction and are provided to the first driving body while being spaced apart from each other in multiple rows and columns;
a plurality of x-axis magnets that are disposed between the z-axis magnets while facing each other in the x-axis direction and provided to the first driving body while being spaced apart from each other in an identical x-axis direction; and a plurality of y-axis magnets that are provided between the z-axis magnets while facing each other in the y-axis direction and are provided to the first driving body while being spaced apart from each other in an identical v-axis direction, and wherein the coil part comprises:

a plurality of z-axis coils that are provided to the second driving body while respectively facing the z-axis magnets;

a plurality of x-axis coils that are provided to the second driving body while respectively facing the x-axis magnets; and a plurality of y-axis coils that are provided to the second driving body while respectively facing the plurality of v-axis magnets.

2. The precise spatial motion device according to claim 1, wherein the first and second driving bodies have a rectangular flat-plate shape corresponding to each other, and the connection part comprises a plurality of elastic bodies that are disposed between the first and second driving bodies and frictionlessly connect the first and second driving bodies to each other.

3. The precise spatial motion device according to claim 1, wherein a driving projection protruding in a z-axis direction is provided to any one of the first and second driving bodies, and a driving hole, through which the driving projection passes, is provided to the other of the first and second driving bodies.

4. The precise spatial motion device according to claim 1, wherein the second driving body comprises a plurality of openings through which the z-axis magnets pass in a z-axis direction.

5. The precise spatial motion device according to claim 1, wherein the z-axis magnets are provided in multiple rows and columns while being spaced apart from each other at an identical interval in x-axis and y-axis directions, at least a pair of x-axis magnets is provided between the z-axis magnets facing in a y-axis direction among the z-axis magnets while facing each other in an x-axis direction, and at least a pair of y-axis magnets is provided between the z-axis magnets facing in an x-axis direction among the z-axis magnets while facing each other in a y-axis direction.

6. The precise spatial motion device according to claim 1, wherein the plurality of z-axis magnets comprise:

a first magnet having a z-axis direction and installed on the first driving body;

a second magnet having a z-axis direction and installed on the first driving body while being spaced apart from the first magnet in a positive (+) x-axis direction;

a third magnet having a z-axis direction and installed on the first driving body while being spaced apart from the first magnet in a negative (−) y-axis direction; and a fourth magnet having a z-axis direction and installed on the first driving body while being spaced apart from the third magnet in a positive (+) x-axis direction, wherein the plurality of x-axis magnets comprise:

a fifth magnet having an x-axis direction and installed between the facing first and second magnets on the first driving body; and a sixth magnet having an x-axis direction and installed between the facing third and fourth magnets on the first driving body while facing the fifth magnet in a y-axis direction, and wherein the plurality of v-axis magnets comprise:

a seventh magnet having a y-axis direction and installed between the facing first and third magnets on the first driving body; and an eighth magnet having a y-axis direction and installed between the second and fourth magnets on the first driving body while facing the seventh magnet in an x-axis direction, and the coil part comprises first to eighth coils that are installed on positions, which respectively face the first to eighth magnets, of the second driving body.

7. The precise spatial motion device according to claim 6, wherein a plurality of openings, through which the first to fourth magnets pass in a z-axis direction, is provided to the second driving body.

* * * * *